United States Patent
Rinck et al.

(10) Patent No.: US 7,783,091 B2
(45) Date of Patent: Aug. 24, 2010

(54) METHOD FOR SEGMENTING ANATOMICAL STRUCTURES FROM 3D IMAGE DATA BY USING TOPOLOGICAL INFORMATION

(75) Inventors: Daniel Rinck, Forchheim (DE); Michael Scheuering, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1008 days.

(21) Appl. No.: 11/220,665

(22) Filed: Sep. 8, 2005

(65) Prior Publication Data
US 2006/0056694 A1 Mar. 16, 2006

(30) Foreign Application Priority Data
Sep. 9, 2004 (DE) .................. 10 2004 043 694

(51) Int. Cl.
*G06K 9/00* (2006.01)
(52) U.S. Cl. .................. 382/128; 382/131; 382/154; 382/173
(58) Field of Classification Search .................. 382/100, 382/128–132, 154, 173, 254
See application file for complete search history.

(56) References Cited

U.S. PATENT DOCUMENTS

| | | | | |
|---|---|---|---|---|
| 5,987,094 | A * | 11/1999 | Clarke et al. | 378/62 |
| 6,106,466 | A * | 8/2000 | Sheehan et al. | 600/443 |
| 6,169,817 | B1 * | 1/2001 | Parker et al. | 382/131 |
| 6,690,816 | B2 | 2/2004 | Aylward et al. | |
| 7,492,934 | B2 * | 2/2009 | Mundy et al. | 382/128 |
| 7,574,247 | B2 * | 8/2009 | Moreau-Gobard et al. | 600/407 |
| 2001/0031920 | A1 * | 10/2001 | Kaufman et al. | 600/431 |
| 2001/0036303 | A1 | 11/2001 | Maurincomme et al. | |
| 2002/0164074 | A1 * | 11/2002 | Matsugu et al. | 382/173 |
| 2002/0181754 | A1 | 12/2002 | Masumoto et al. | |
| 2003/0053667 | A1 * | 3/2003 | Paragios et al. | 382/128 |
| 2003/0076987 | A1 * | 4/2003 | Wilson et al. | 382/128 |
| 2004/0184647 | A1 | 9/2004 | Reeves et al. | |
| 2006/0210158 | A1 * | 9/2006 | Pekar et al. | 382/173 |

(Continued)

OTHER PUBLICATIONS

M.S. Brown et al.: << Method for Segmenting Chest CT Image Data Using an Anatomical Model : Preliminary Results >>, in : IEEE Transactions on Medical Imaging, Dec. 1997, vol. 16, No. 6, S.828-839.

(Continued)

*Primary Examiner*—Bhavesh M Mehta
*Assistant Examiner*—Eric Rush
(74) *Attorney, Agent, or Firm*—Harness, Dickey & Pierce, P.L.C.

(57) ABSTRACT

A method is disclosed for segmenting anatomical structures, in particular the coronary vessel tree, from 3D image data. In the method, a starting point is initially set in the 3D image data, and at least one known anatomically significant point and/or at least one known anatomically significant surface are/is identified in the 3D image data. Subsequently, proceeding from the starting point the structure is subsequently segmented pixel by pixel with the aid of a multiplicity of segmentation steps in such a way that an instantaneous distance is determined automatically relative to the anatomically significant point and/or to the anatomically significant surface in each segmentation step. Further, segmentation parameters and/or a selection of adjacent pixels for continuing the segmentation are/is established as a function of the distance, taking account of a model topology. The method enables an accurate and reliable segmentation of the anatomical structure.

18 Claims, 3 Drawing Sheets

U.S. PATENT DOCUMENTS

2006/0250386 A1* 11/2006 Movassaghi et al. ........ 345/419

OTHER PUBLICATIONS

German Office Action issued Aug. 19, 2005.
T. Boskamp, et al., "New Vessel Analysis Tool for Morphometric Quantification and Visualization of Vessels in CT and MR Imaging Data Sets", Radiographics 2004, 24, S.287-297.
Office Action cited in corresponding Indian Patent Application No. 814/Kol/05 dated Aug. 27, 2009.
Office Action cited in corresponding Chinese Application No. 200510099168.3 dated Jun. 6, 2008.
Dirk Selle et al, "Analysis of Vas. For Liver Surgical Planning," IEEE Transaction on Medical Imaging, vol. 21, No. 11, Nov. 2002, pp. 1344-1357.

* cited by examiner

METHOD FOR SEGMENTING ANATOMICAL STRUCTURES FROM 3D IMAGE DATA BY USING TOPOLOGICAL INFORMATION

The present application hereby claims priority under 35 U.S.C. §119 on German patent application number DE 10 2004 043 694.0 filed Sep. 9, 2004, the entire contents of which is hereby incorporated herein by reference.

FIELD

The present invention generally relates to a method for segmenting anatomical structures, in particular of the coronary vessel tree, from 3D image data such as are generated, for example, in CT angiography (CTA). The present method may be applied in the field of computed tomography when recording vessel structures.

BACKGROUND

A great advantage of CT angiography by comparison with other imaging techniques such as magnetic resonance (MR) tomography, PET (Positron Emission Tomography), SPECT (Single Photon Emission Computed Tomography) or the 3D ultrasound technique resides in that, for example, the entire vessel tree of the heart can be recorded with a single CT scan by adding a contrast agent. The 3D image data thereby obtained can be visualized using different techniques.

For a quantitative evaluation, in particular a measurement of stenoses or of plaque deposits, it is necessary for the corresponding regions of the vessel structure to be segmented from the 3D image data. This segmentation is performed in a follow-up process on an image computer.

The currently most frequently used and commercially available technique of segmentation is the technique of so-called region growing. In this technique, all the respectively adjacent pixels (voxels) are analyzed starting from seed points, which can be prescribed by the user, in the 3D image data, and identified as part of the vessel structure upon fulfillment of specific conditions. As one condition for the membership of the vessel structure, it is possible, for example, to check whether the voxel falls into a prescribed HU range (HU: Hounsfield Units).

It is also possible to prescribe for the density gradients between adjacent voxels a highest value above which the adjacent voxel is no longer regarded as part of the vessel structure. The voxels respectively newly identified as part of the vessel structure are used, in turn, as starting points for the next step of analysis or segmentation. In this way, the already identified structure grows three-dimensionally until the complete, prescribable region of the vessel structure is segmented. An example of the use of such a technique for segmenting vessel structures can be taken from the publication by T. Boskamp et al. "New Vessel Analysis Tool for Morphometric Quantification and Visualization of Vessels in CT and MR Imaging Data Sets", Radiographics 2004, 24, 287-297, the entire contents of which are hereby incorporated herein by reference.

The known region growing technique operates in many instances satisfactorily, but does not reach all the vessels that are visible to a viewer in a display of the 3D image recording. Whereas, given a suitable 3D visualization technique, the human eye can also still detect the smallest vessels as part of the structure, the segmentation algorithm detects only specific homogeneous, coherent parts in the volume examined. Furthermore, it is also possible for the segmented structure to be washed out in adjacent image areas when they have similar HU values and lie very near to the vessel structures.

SUMMARY

An object of at least one embodiment of the present invention resides in specifying a method for segmenting anatomical structures, in particular of the coronary vessel tree, from 3D image data which permits a more reliable segmentation of the structures.

For the purpose of segmenting anatomical structures from 3D image data, in particular from CTA image data, in the case of at least one embodiment of the present method, the first step is to set a starting point, preferably in a region starting from which the structure to be segmented extends, and identify at least one known anatomically significant point and/or at least one known anatomically significant surface in the 3D image data. Subsequently, proceeding from the starting point the structure is segmented pixel by pixel with the aid of a multiplicity of segmentation steps in such a way that an instantaneous distance is determined automatically relative to the anatomically significant point and/or to the anatomically significant surface in each segmentation step, and segmentation parameters and/or a selection of adjacent pixels for continuing the segmentation are/is established as a function of the distance by taking account of a known model topology.

In the case of at least one embodiment of the present method, therefore, use is additionally made for the segmentation of known topological information, also denoted in the present patent application as model topology, which enables a more reliable segmentation of the structure. By using the respective knowledge of the instantaneous segmentation position, relative to the previously identified significant points or surfaces, and the knowledge of the fundamental topology in the region of the structure, it is possible firstly to exclude erroneous segmentation in regions where no parts of the structure can be present any more because of the topological knowledge.

On the other hand, by automatically changing the segmentation parameters as a function of the segmentation position, the segmentation can also still locate vessels in regions where vessels must still be present because of the topological knowledge. A normal segmentation would, however, be truncated because of a local undershooting or overshooting of the threshold values set.

The segmentation parameters that are established for each segmentation step as the structure is traversed include in the field of the CTA, for example, HU threshold values for the voxels corresponding to the pixels or threshold values for density gradients between adjacent voxels. The solid angle at which the further segmentation is performed is restricted by establishing a selection of adjacent pixels for a continuation of segmentation as a function of the instantaneous distance. The segmentation can be carried out in this way in a fashion similar to the known region growing although here it is not normally all the pixels adjacent in the volume that are subjected to an analysis, but only pixels in the respectively established solid angle. For this reason, the starting point is preferably set in a region starting from which the structure to be segmented extends such that a specific segmentation direction is already thereby prescribed.

The instantaneous distance from the previously identified significant points or surfaces is preferably determined with the aid of at least one distance array that is set up before the start of segmentation and proceeds from the respectively identified point or the respectively identified surface. In the case of a number of identified points and/or surfaces, it is also possible to calculate a number of distance arrays that then respectively specify the distance from the point on which they are based or of the surface on which they are based. These one or more distance arrays are assigned to the pixels or voxels in the 3D image data set such that the distance from the respective anatomically significant point or the respective anatomically significant surface is immediately known for each individual voxel during the segmentation. This distance is then used in establishing the instantaneous segmentation parameters by taking account of the known model topology.

When carrying out at least one embodiment of the method, taking account of the known model topology in this way in order to determine the instantaneous segmentation parameters can be performed by recourse to a provided table in which for a known model topology respectively prescribed segmentation parameters are assigned to the different distances relative to the anatomically significant point and/or the anatomically significant surface, and/or one or more prescribed segmentation directions are assigned in order to continue of the segmentation. Thus, depending on distance from the anatomically significant point, it is possible to establish the solid angle at which the segmentation is continued. Furthermore, depending on this distance it is also possible to vary the range of the HU values within which the voxels belonging to the structure must lie. The same holds for any other segmentation parameters that can be used to segment the structure.

In a development of at least one embodiment of the present method, when the segmentation is truncated because of a lack of adjacent voxels that satisfy the prescribed conditions a search is automatically carried out for continuing the structure in the closer surroundings if a truncation of the structure because of the topological information is unlikely given the instantaneous distance from the one or more anatomically significant points and/or surfaces. If continuation voxels are found that match the truncated structure with regard to the further course, the gap lying therebetween can be closed by interpolation, and the segmentation can be continued with the aid of the continuation voxels. This search for continuation structures in the event of a truncation of the segmentation in a branch of the structure can be performed either already directly after the respective truncation or else not until after the segmentation has come to a standstill in all branches of the structure. In the latter case, such truncation points are firstly stored in order then to be able to search for a continuation of the structure in the end phase of the method at these points.

Even though the main field of application of at least one embodiment of the present method is the segmentation of anatomical vessel structures in 3D image data in CTA imaging, the method can also be used for segmenting other anatomical structures, including in 3D image data of other imaging techniques such as, for example, MR, PET, SPECT, or 3D ultrasound as long as suitable segmentation parameters are available for segmentation.

BRIEF DESCRIPTION OF THE DRAWINGS

The method is explained below once more in more detail with the aid of an example embodiment in conjunction with the drawings, in which.

DETAILED DESCRIPTION OF THE EXAMPLE EMBODIMENTS

Figure 1:
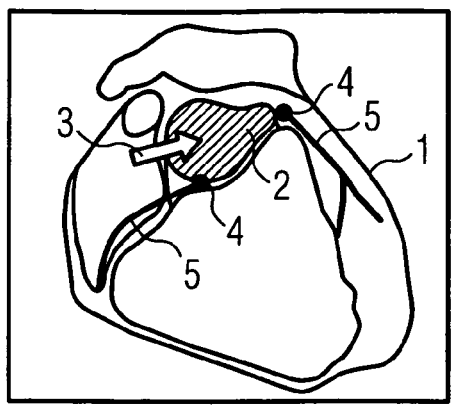
FIG. 1 shows an example of a first step in carrying out an embodiment of the method.

There is a description in the present example of various steps for segmenting the coronary vessel tree from 3D image data that have been recorded using a CTA technique. Here, the figures illustrate different views of the heart and of the heart chambers and vessels contained therein which are merely indicated schematically because the images themselves lack the capacity for illustration. FIG. 1 shows in this case a view of the entire heart 1 in which a section through the aorta 2 is to be recognized in the top area. In the first step, a starting point is set interactively on the display screen by clicking on the aorta 2, for example using a mouse pointer 3. Proceeding from this starting point, the two branch points 4 at which the aorta 2 branches into the coronary vessel structure 5 are detected automatically. These branch points 4 are marked.

Figure 2A:
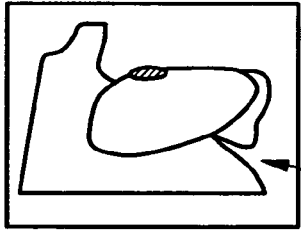
FIGS. 2A-2C show an example of a second step in carrying out an embodiment of the method.
Figure 2B:
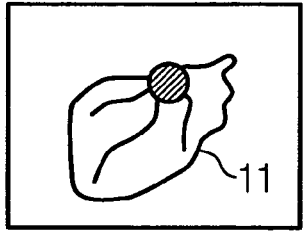
Figure 2C:
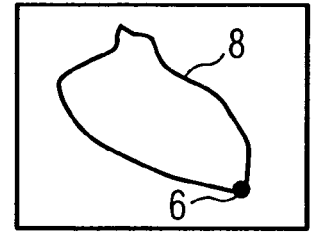

As is to be seen from the part FIGS. 2A, 2B and 2C, in the next step the heart chambers 11, that is to say the left-hand and right-hand atrium and also the ventricles, are segmented and anatomical landmarks, in the present example the apex 6 of the left-hand ventricle 8, are detected and marked. Different stages of this segmentation are to be seen in this case in the part FIGS. 2A, 2B. FIG. 2C shows the segmented left-hand ventricle 8 on whose surface the apex 6 is marked as anatomical landmark. This marking is performed automatically by an image processing algorithm that recognizes the apex of the left-hand ventricle.

Figure 3A:
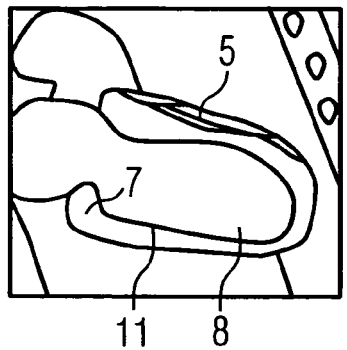
FIGS. 3A-3B show an example of a third step in carrying out an embodiment of the method.
Figure 3B:
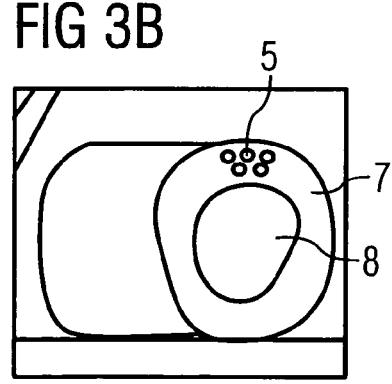

A distance array around the heart is calculated in the next step. In this case, the surface points of the segmented heart chambers 11, which are enriched with the aid of contrast agent, are used as starting points. FIG. 3A shows, to this end, an illustration in which the myocardium 7 is to be recognized on the outside and the left-hand ventricle 8 is to be recognized on the inside. FIG. 3B again shows another view of the left-hand ventricle 8. The vessel structure 5 is indicated in these illustrations.

Figure 4:
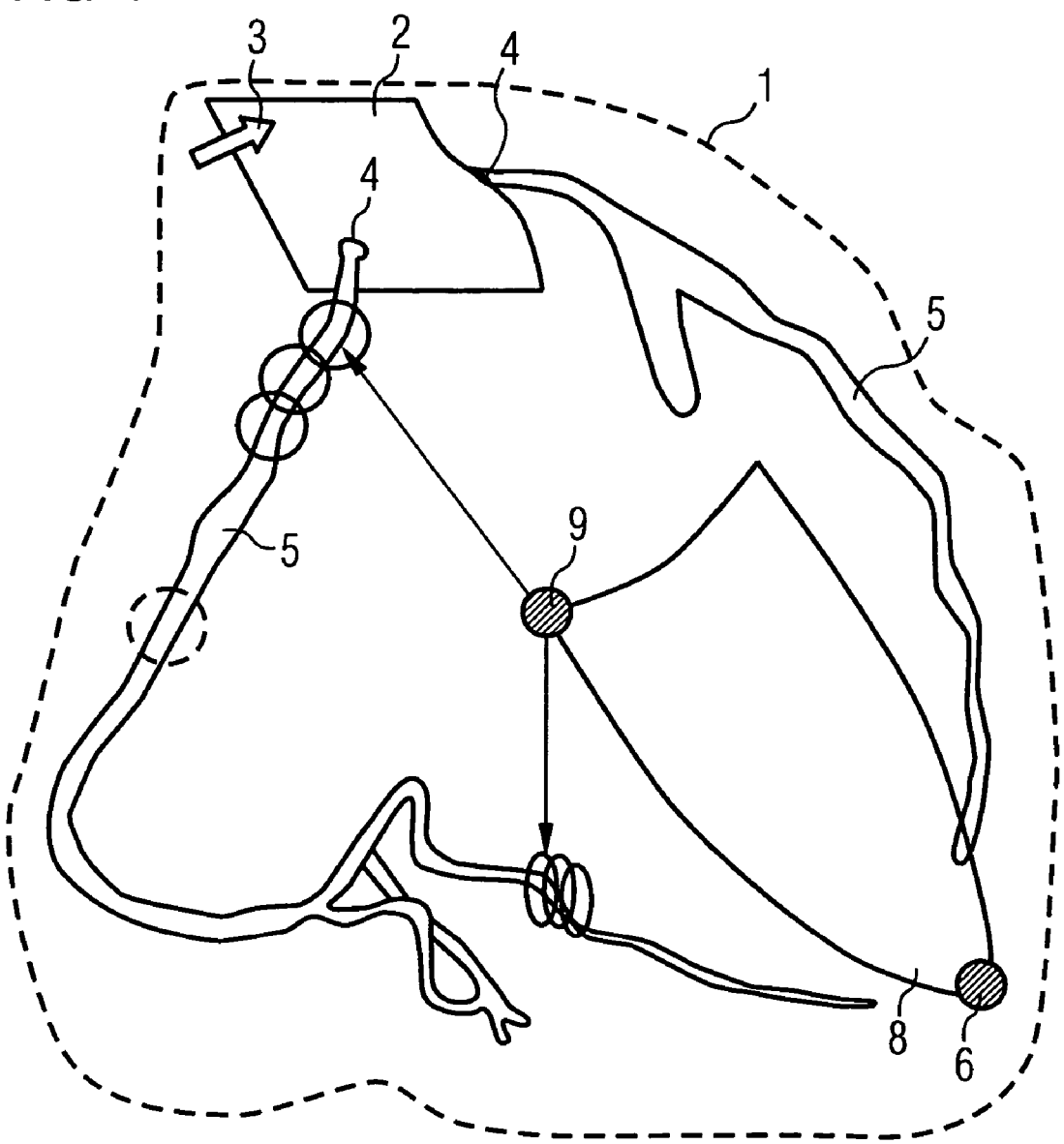
FIG. 4 shows an example of a fourth step in carrying out an embodiment of the method.

The actual segmentation of the vessel structure 5 is performed after these preparatory steps. The segmentation begins at the branch points 4 that are detected in the first step and which are also indicated in the illustration of FIG. 4.

The segmentation is carried out in accordance with at least one embodiment of the present method with the aid of an adaptive, topological segmentation technique. FIG. 4 shows in this regard a part of the aorta 2, together with the coronary vessel structure 5 branching away therefrom. The heart 1 is indicated by the dashed frame. Furthermore, the position of the left-hand ventricle 8 and of two anatomical landmarks, the apex 6 and the geometric centroid 9 of the heart, are also marked in this illustration.

In the case of at least one embodiment of the present method, the segmentation is performed in an ordered way in which the complex structure 5 is analyzed step by step as a function of the instantaneous position relative to the previously marked landmarks 6, 9. The current shape, size and position of the vessel section inside the heart is detected in this way at any time by the segmentation algorithm, since the distance from the surface of the heart chambers, in particular from the apex 6 or from the centroid 9 of the heart is known at any time from the distance array.

The threshold value for the segmentation, for example, can be adapted in each case by way of this knowledge to the current segmentation position. More strongly distally positioned vessels frequently require a lower threshold value in order to distinguish them from the surrounding structures. The distance from the apex 6, which is known for every segmentation step, is used in the event of a truncation of the segmentation in a vessel branch to decide whether a search will be made in the closer surroundings for a continuation of the structure. If the distance from the apex 6 is greater than a prescribable value for which vessels normally lose their good contrast with the surroundings, this truncation position is then firstly stored for a later continuation step.

The segmentation itself can, for example, be performed by using a distance transformation algorithm in which spheres are enlarged in the respective vessel section until they cut the vessel. Segmentation is performed in this case by taking account of the topological information relating to the structure of a heart, that is to say by taking account of a topological heart model not in all spatial directions as for the conventional region growing technique, but in a directed way. This segmentation with the aid of spheres that are enlarging is indicated by the rings in FIG. 4.

The respective information relating to position or distance is determined here in a fashion related to an anatomical landmark or else to a number of anatomical landmarks, as in the present example. The segmentation device can be prescribed by this knowledge of the position such that erroneous segmentation is avoided in regions where vessels can no longer be present because of the topology.

In the present example, after the vessel structure 5 has been traversed in accordance with the steps previously explained, a search is carried out at the previously stored truncation positions for continued structures at which the segmentation was truncated for lack of adjacent pixels satisfying the segmentation condition. These positions are stored when a truncation of the vessel structure is unlikely because of the topological information at this point. An automatic search in the closer surroundings is then carried out at these points for voxels that could constitute a continuation of the vessel structure.

Use is made in this case of the fact that the coronary tree can be represented by a vector set having an associated item of diameter information, that is to say by a set of juxtaposed cylinders. The tangential vector is calculated along this ordered vector set. This calculation can be used to estimate the region in which the continuation of the vessel would have to lie.

Figure 5:
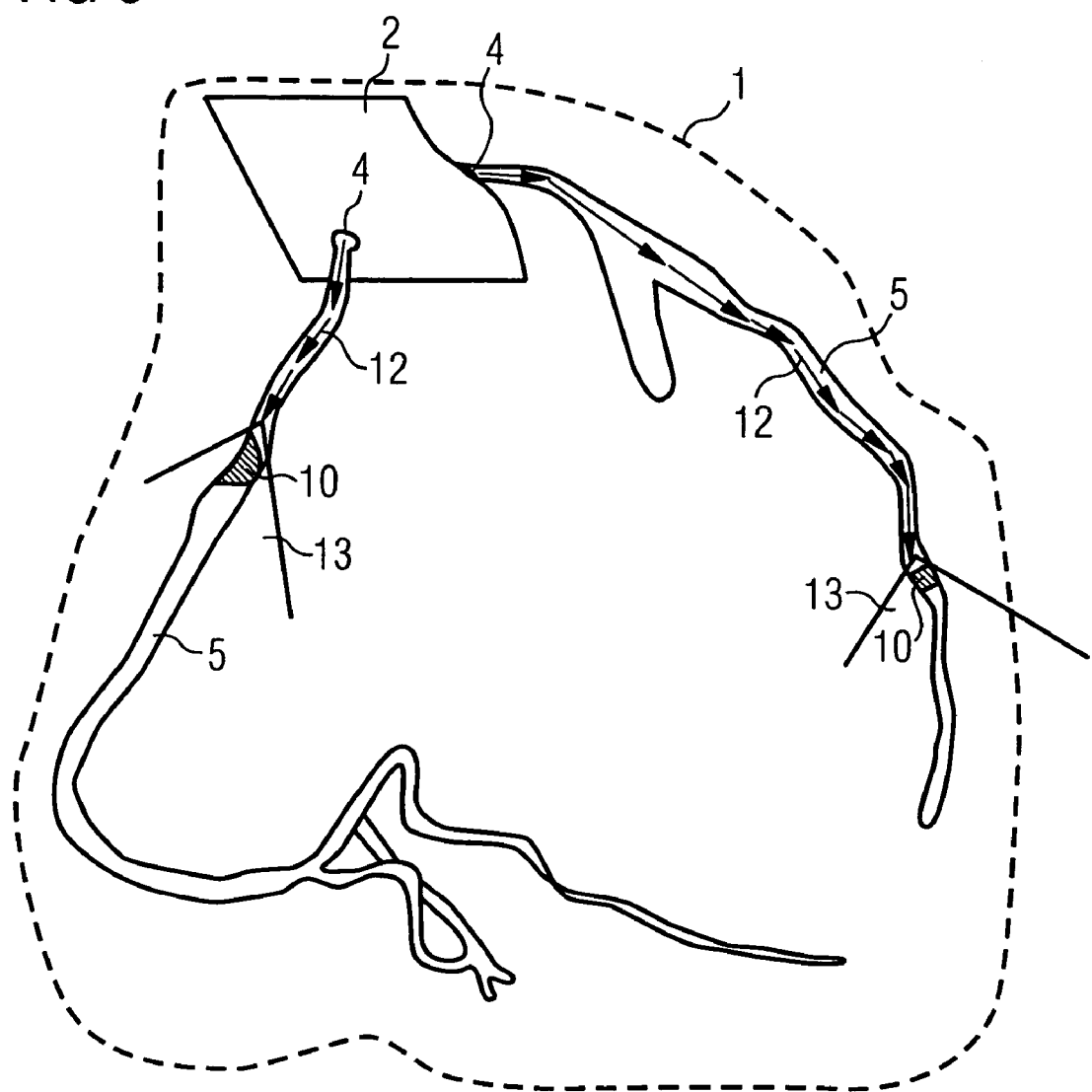
FIG. 5 shows an example of a fifth step in carrying out an embodiment of the method.

The image processing algorithm attempts to identify possible vessel regions in this calculated search region, for example by analyzing the local Hessian matrix, or by calculating the eigenvectors of voxel clusters that lie inside the valid HU range for the vessel structure. If such voxels are found, they are connected to the already segmented structures by interpolation. The tangential vectors 12 are indicated in FIG. 5, as is also the search region 13 prescribed by these vectors. A gap 10 in the illustration of the vessel structure 5 that is filled up by this last step is also respectively to be seen in this case in the figure.

Structurally specific or topological information is taken into account with the aid of at least one embodiment of the present method when segmenting the structure. Given the prescription of a smoothness condition with regard to the course of the vessels, it is possible to achieve the situation where only plausible voxels are calculated in relation to the vessel structure in each segmentation step. Taking account of the distance from previously identified anatomical landmarks, in particular from the surface of the heart chambers, ensures that only vessels outside the already segmented heart chambers are identified. This prevents the segmented structure from straying into other surrounding structures such as, for example, the heart chambers.

At least one embodiment of the method can be used, for example, to segment the coronary vessel tree much more accurately than is possible with the aid of the previously known methods of the prior art. Not only the vessel tree itself, but the entire anatomy of the heart are analyzed in the segmentation. The additional search step for filling up interrupted vessel structures renders it possible to detect and segment even the smallest vessel structures.

The above described embodiments of the method may further be embodied in a physical device, as would be understood by one of ordinary skill in the art, including via use of the disclosed and/or illustrated examples.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for segmenting anatomical structures from 3D image data, the method comprising:
   setting a starting point in the 3D image data;
   identifying at least one of at least one known anatomically significant point and at least one known anatomically significant surface in the 3D image data;
   segmenting, proceeding from the starting point, the anatomical structure pixel by pixel with a multiplicity of segmentation steps such that an instantaneous distance is determined automatically relative to at least one of the at least one known anatomically significant point and to the at least one known anatomically significant surface in each segmentation step;
   establishing at least one of segmentation parameters and a selection of adjacent pixels for continuing the segmentation as a function of the determined distance, taking account of a model topology; and
   displaying a result of the segmentation process,
   wherein when a truncation point during the segmentation process is reached at a position at which the anatomical structure should not be truncated, based on the model topology, a search algorithm searches for pixels and continues the segmentation of the anatomical structure in an image region determined by an extrapolation of the already segmented anatomical structure, and
   wherein a gap in the segmented anatomical structure is filled up by means of interpolation.

2. The method as claimed in claim 1, wherein before the start of segmenting the anatomical structure, at least one distance array is set up proceeding from the at least one known anatomically significant point, or the at least one known anatomically significant surface and is assigned to the pixels, at least one of the instantaneous distance relative to the at least one known anatomically significant point and the at least one known anatomically significant surface being determined directly from the distance array for each pixel during the segmentation process.

3. The method as claimed in claim 1, wherein the segmentation parameters are established for each segmentation step by recourse to a table in which respectively prescribed segmentation parameters are assigned to the different distances relative to at least one of the at least one known anatomically significant point and the at least one known anatomically significant surface.

4. The method as claimed in claim 1, wherein the selection of adjacent pixels for continuing the segmentation process is established for each segmentation step by recourse to a table in which in each case at least one prescribed segmentation directions are assigned to the different distances relative to at least one of the at least one known anatomically significant point and the at least one known anatomically significant surface in order to continue the segmentation process.

5. The method as claimed in claim 1, wherein tangential vectors of the already segmented anatomical structure are calculated in the region of the truncation point for the extrapolation.

6. The method as claimed in claim 5, wherein in order to detect pixels for continuing the anatomical structure a smoothness condition must be satisfied between the tangential vectors of the already segmented anatomical structure and tangential vectors of the continued structure in the region of the truncation point.

7. The method as claimed in claim 1, wherein when segmenting a coronary vessel tree from 3D image data of a heart the starting point is set in the aorta, and the apex and a geometrical centroid of the heart is identified in the 3D data as the at least one known anatomically significant point.

8. The method as claimed in claim 1, wherein when segmenting a coronary vessel tree from 3D image data of a heart the starting point is set in the aorta and a surface of the heart chambers that has been segmented in advance is identified in the 3D image data as the at least one known anatomically significant surface.

9. The method of claim 1, wherein the method is for segmenting a coronary vessel tree.

10. A method for segmenting anatomical structures from a starting point in 3D image data, the method comprising:
identifying at least one of at least one known anatomically significant point and at least one known anatomically significant surface in the 3D image data;
determining a distance relative to at least one of the at least one known anatomically significant point and to the at least one known anatomically significant surface in each of a plurality of segmentations, the plurality of segmentations proceeding pixel by pixel from the starting point;
establishing at least one of segmentation parameters and a selection of adjacent pixels for continuing the segmentation process, at least partially as a function of the determined distance; and
displaying a result of the segmentation process,
wherein when a truncation point during the segmentation process is reached at a position at which the anatomical structure should not be truncated, based on a model topology, a search algorithm searches for pixels and continues the segmentation of the anatomical structure in an image region determined by an extrapolation of the already segmented anatomical structure, and
wherein a gap in the segmented anatomical structure is filled up by means of interpolation.

11. The method of claim 10, wherein the method is for segmenting a coronary vessel tree.

12. The method as claimed in claim 10, wherein before the start of segmenting the anatomical structure, at least one distance array is set up proceeding from the at least one known anatomically significant point, or the at least one known anatomically significant surface and is assigned to the pixels, at least one of the instantaneous distance relative to the at least one known anatomically significant point and the at least one known anatomically significant surface being determined directly from the distance array for each pixel during the segmentation process.

13. The method as claimed in claim 10, wherein the segmentation parameters are established for each segmentation step by recourse to a table in which respectively prescribed segmentation parameters are assigned to the different distances relative to at least one of the at least one known anatomically significant point and the at least one known anatomically significant surface.

14. The method as claimed in claim 2, wherein the segmentation parameters are established for each segmentation step by recourse to a table in which respectively prescribed segmentation parameters are assigned to the different distances relative to at least one of the at least one known anatomically significant point and the at least one known anatomically significant surface.

15. The method as claimed in claim 2, wherein the selection of adjacent pixels for continuing the segmentation process is established for each segmentation step by recourse to a table in which in each case at least one prescribed segmentation directions are assigned to the different distances relative to at least one of the at least one known anatomically significant point and the at least one known anatomically significant surface in order to continue the segmentation process.

16. The method as claimed in claim 3, wherein the selection of adjacent pixels for continuing the segmentation process is established for each segmentation step by recourse to a table in which in each case at least one prescribed segmentation directions are assigned to the different distances relative to at least one of the at least one known anatomically significant point and the at least one known anatomically significant surface in order to continue the segmentation process.

17. The method as claimed in claim 1, wherein the 3D image data is generated in a Computed Tomography (CT) angiography.

18. The method as claimed in claim 10, wherein the 3D image data is generated in a Computed Tomography (CT) angiography.

* * * * *